United States Patent Office 2,783,122
Patented Feb. 26, 1957

2,783,122

WELL DRILLING COMPOSITION AND METHOD OF MANUFACTURE THEREOF

Howard H. Hoekje, Corpus Christi, Tex., assignor to Columbia-Southern Chemical Corporation, Allegheny County, Pa., a corporation of Delaware No Drawing. Application May 12, 1953,
Serial No. 354,633

6 Claims. (Cl. 8—94.32)

This invention relates to a novel composition and method of preparing the same. It is known that tannic acid and humic acid are valuable for many purposes. As a typical illustration, certain tannic acid extracts have been used for the purpose of adjusting the viscosity of oil well drilling muds and also in the tanning of leather.

Tannic acid useful for this purpose is obtained from various woods and also from certain barks, shells, and other fibrous materials containing tannin. Humic acid useful for this purpose is obtained from varous mineral compositions containing degraded vegetable material, such as lignite, lignite shale, and the like. In many cases, the bark, lignite shale or the like is used directly without attempt to extract the tannic acid component therefrom. In other case, the active tannic acid or humic acid is extracted from these materials and the extract is used.

A serious objection to this process is that whether the extract is separately recovered or the bark or like product is used directly, the undissolved residue or sludge is inert and of no substantial utility. Thus, when tree bark or lignite is extracted with water, a very large portion thereof remains undissolved and undispersed in the water solution. This insoluble material has had little or no significant utility.

The present invention affords a convenient method of converting these products into more useful material. In accordance with this invention, a tree bark, lignite shale, quebracho wood or like material is extracted with water, alcohol, ether or the like to remove therefrom the soluble tannic acid and/or humic acid, and the residue is digested with aqueous alkali metal hydroxide to increase the solubility and/or dispersibility thereof. The resulting solubilized material may then be reacted with the tannic or humic acid extract to reduce the alkalinity or it may be used as such for various purposes.

By following this procedure, lignins and/or other components present in naturally occurring materials which contain tannic acid are rendered active while avoiding consumption of alkali metal hydroxide by tannic acid. The extracted tannic acid may be used for other purposes. However, it may be used with special advantage to reduce the alkalinity of the alkali metal hydroxide digested product.

The resulting products are salts of the lignin or degraded lignin components which may or may not contain tannic and/or humic acid and/or salts thereof, and are good dispersing agents. They may be used effectively in the adjustment of the viscosity of oil well drilling muds. They also may be used in the tanning of leather, in cements such as Portland cement in order to increase the strength thereof, and in various other fields where tannin compositions are useful.

In the performance of the process, a naturally occurring material such as tree bark, nut hulls, high tannin woods, peat, lignite, and like materials which contain in excess of 5 to 10 percent of water soluble humic acid or tannin are pulverized or finely divided and extracted with hot water. The extract is then removed and the residue is dispersed in an aqueous alkali metal hydroxide such as sodium hydroxide solution. The resulting dispersion is heated until the dispersibility and/or solubility of the solids are substantially increased.

The exact amount of alkali metal hydroxide which is required depends upon the amount of components which may be acted upon present in the material undergoing treatment. In general, the amount of such hydroxide used ranges from about 4 parts of alkali metal hydroxide by weight per part of tannic or humic acid containing material such as lignite, lignite shale, bark, etc. to one of alkali metal hydroxide per 10 to 20 parts by weight of such material. Usually, sufficient alkali metal hydroxide is used to provide an excess so that the pH of the product after digestion is in excess of about 10.

Solutions of any convenient concentration of sodium hydroxide or like alkali metal hydroxide may be used, although extremely dilute solutions have the objection of containing an excessive amount of water which must be removed from the mixture whereas solutions containing excessively high amounts of sodium hydroxide are viscous and difficult to handle. Normally, these solutions should contain about 5 to about 70 percent by weight of NaOH or its equivalent.

The slurry thus formed is subjected to heat. This heating effectively serves to convert certain components which are insoluble in cold alkali metal hydroxide to a more soluble or at least more dispersible state. The time of heating which is required in order to effect this result depends to a considerable degree upon the temperature of heat. For example, when the heating is effected at temperatures of 75 to 100° C., it is necessary to heat over relatively long periods, for example, 1 or more hours. On the other hand, shorter periods are permissible when the temperature of heating is above 100° C., and much longer periods are required at lower temperatures. When the slurry is evaporated at a temperature above 100° C., the evaporation of the product to dryness (a solid product) effects the desired digestion. Thus, if desired, the mixture may be spray dried or may be dried on a drum or tray dried. This results in the production of a pulverulent granular solid which may contain more or less water (5 percent or more).

In accordance with a further embodiment, it is also possible to effect the required heating or digestion without removing a large amount of water, at least while limiting the amount of water removed so that a slurry remains. This may be done by long heating at a temperature below the boiling point of the solution or by heating under pressure and/or by replacing evaporated water during the heating.

In any case, the heating is continued until a substantial portion of the insoluble components are solubilized or at least rendered more dispersible in the mixture. That is, the resulting product, when dispensed in water, does not settle to any appreciable degree and actually as much as 60 to 90 percent thereof goes into colloidal or true solution.

Following the heat treatment, the product obtained normally has a relatively high pH. Since caustic soda is consumed as a consequence of the heating, the amount thereof, if any, which remains depends upon whether a sufficient excess over acidic components initially was present. Generally, this product has a pH above about 10 although less alkaline products having a pH of 8 to 10 may be produced.

For many purposes, a product of reduced alkalinity is required. For example, in the oil fields when these products are used as oil well drilling mud additives, it frequently is advantageous to have available a product having a pH in the range of 9 to 10. In other fields it is even advantageous to have an acidic material. Accordingly, the resulting product is treated with a suitable acidic component in order to reduce the pH below about 10, usually in the range of about 7 to 10, although a lower pH may be achieved if desired. Mineral acids, such as hydrochloric acid, sulphuric acid or phosphoric acid, or the acidic salts, such as ammonium chloride, alum, aluminum sulfate, sodium bicarbonate, and the like may be used for the purpose of reducing the acidity. For many purposes, however, the presence of the corresponding salts of such materials is objectionable. While they may be removed by washing or fractionation processes, this often is uneconomical.

Best results are obtained when the product, after digestion or heating with alkali metal hydroxide, is treated with a product containing tannic acid or humic acid. In such a case, the resulting product is a mixture of tannic or humic acid components and their salts. Since the added tannic or humic acid component has the same general properties and is capable of the same general usage as the alkali metal hydroxide treated product, undesirable dilution or contamination of the product is thereby avoided.

Accordingly, the alkalinity of the alkali metal hydroxide treated product may be reduced by mixing the product with tannin extract such as quebracho extract, wattle extract, or other tannin-containing materials of the type listed above, or lignite shale, or lignite or like material containing humic acid. Preferably, these materials should contain in excess of about 5 to 10 percent by weight of the tannic acid. Humic acid is determined by extraction with 5 percent sodium hydroxide at room temperature. Tannic acid may be determined by extraction with hot water.

The alkalinity reduction may be effectively accomplished by adding the acidic component to an aqueous slurry of the alkali metal hydroxide treated product. For example, if the alkali metal hydroxide treated product has not been dried to a solid state, the acidic component may be added directly to the slurry after the heating treatment. On the other hand, if a dried product has been produced by the heat treatment, this dried product may be slurried in water and the acid component added. Following this, the resulting product is dried in accordance with standard procedures. If desired, it may be further baked in order to improve the solubility characteristics thereof.

According to the preferred embodiment, the water extract obtained prior to the sodium hydroxide digestion may be used to effect the contemplated alkali reduction. It will be understood, of course, that the extract need not be the identical one which was extracted from the residue to be acid treated since it may obviously be obtained from a different batch. The process of acidifying the digested product with the acid extract obtained by water or like extraction prior to digestion of the tannin containing material is especially advantageous since it permits production of the final product from the raw tannin-containing material without recourse to other tannin materials.

According to a further embodiment, dried products produced by heating excess alkali metal hydroxide with a tannin or humic acid composition of the type herein discussed until a dry product has been obtained may be treated. Thus, these products may be ground up with dried tannin extract produced by evaporating a water extraction of a tannin or humic acid containing material as described above. In such a case, the dry product when dissolved in water will react to reduce the alkalinity thereof.

Various puverulent adsorbent diluents such as calcium carbonate and other alkaline earth metal carbonates, silica, alkaline earth metal silicates, zinc oxide, kaolin, bentonite, fuller's earth, wood fibers, magnesium oxide, etc. may be added to the composition. These materials serve to adsorb any water which might otherwise be picked up by the composition and to retain it in a pulverulent state.

The above described process may be applied to the treatment of many types of tannic acid containing materials. Thus, tree barks including the barks of mangrove, mimosa (wattle), redwood, sumac, cutch, quercitron, divi divi, oak, pistachio, osage orange, logwood, celery pine, chestnut, tarnwood, and the like may be extracted with water and the water insoluble portion digested with caustic as above described. Other materials which may be so treated include wood products such as quebracho chips, chestnut wood, buttonwood, ironwood or peat.

The following examples are illustrative:

Example I

Mangrove bark ground to through 10 mesh and containing approximately 32 percent of tannic acid was mixed with water in the proportion of 100 grams of mangrove bark to 275 grams of water. This mixture was brought to a boil and kept boiling for 1 hour. Thereupon, the resulting mixture was strained through a 48-mesh screen and the residue upon the screen was rinsed with 125 milliliters of water. This wash water was combined with the water extract or filtrate.

The remaining residue was mixed with 50 grams of aqueous caustic soda solution containing 50 percent by weight of NaOH. The slurry was heated to boiling temperature and kept boiling for 1 hour while periodically replacing the water which boiled off. The original filtrate was then added to the thus digested slurry and the slurry was made up to 1000 grams with distilled water. This diluted slurry was placed in an oven at a temperature of 157° C. for 47 hours. The resulting product was ground and bottled and the bottled product was heated in an oven overnight at 157° C. When a portion of this product was dissolved in water to form a 2 percent solution thereof, the pH of the resulting solution was 10. The percent of the product which was insoluble was only about 20 percent.

Example II

The process of Example I is performed except that the filtrate was not added to the digested slurry. The dry product thus obtained has a pH higher than the product of Example I.

If desired, the filtrate from the water extraction may be dried and milled together with the product of Example III.

Example III

The process of Example I is performed except that instead of adding the filtrate to the digested slurry, sufficient hydrochloric acid is added to produce an acid product having a pH of about 6.

Example IV

A milk of lime slurry was made up containing 322 grams per liter of calcium oxide in the form of calcium hydroxide. This slurry also contained approximately 25 grams per liter of calcium carbonate. Four hundred pounds of ground wattle bark, 332 pounds of an aqueous solution of sodium hydroxide containing 50 percent by weight of sodium hydroxide, and 133.2 pounds of sodium carbonate were mixed together with sufficient of the milk of lime slurry described above to introduce 70.2 pounds of calcium oxide into the mixture. This mixture was boiled with stirring to effect a solution of the soluble components thereof at a temperature of approximately 90 to 100° C. Thereupon, sufficient wattle bark extract produced by extracting wattle bark with water at 85 to 100° C. is added to reduce the pH of the slurry to approximately 10. This product is then evaporated to dryness.

While the invention has been described with particular reference to sodium hydroxide, it is also to be understood that other alkali metal hydroxides may be used in lieu of or in conjunction with sodium hydroxide. Typical alkali metal hydroxides of this type include potassium hydroxide and lithium hydroxide. However, best results are obtained when sodium hydroxide is used.

Although the present invention has been described with reference to the specific details of certain embodiments thereof, it is not intended that such details shall be regarded as limitations upon the scope of the invention except insofar as included in the accompanying claims.

What is claimed:

1. A method which comprises extracting a naturally occurring material which contains at least 5 percent by weight of tannic acid with water whereby to produce an aqueous solution of tannic acid and an unextracted residue, removing the resulting tannic acid solution from the residue, digesting the residue with enough aqueous alkali metal hydroxide to solubilize the components thereof and to produce an alkaline product, and adding acid of the group consisting of tannic and humic acids to said product and thereby reducing the alkalinity thereof.

2. The process of claim 1 wherein the digestion is conducted at a temperature above 90° C. and the amount of said alkali metal hydroxide is sufficient to produce a product having a pH in excess of 10.

3. A method which comprises extracting tree bark which contains at least 5 percent by weight of tannic acid with water whereby to produce an aqueous solution of tannic acid and an unextracted residue, removing the resulting tannic acid solution from the residue, digesting the residue with enough aqueous alkali metal hydroxide to solubilize the components thereof and to produce an alkaline product, and adding acid of the group consisting of tannic and humic acids to said product and thereby reducing the alkalinity thereof.

4. The process of claim 3 wherein the digestion is conducted at a temperature above 90° C. and the amount of said alkali metal hydroxide is sufficient to produce a product having a pH in excess of 10.

5. A method which comprises extracting a natural material containing at least 5 percent by weight of tannic acid with water to produce a tannic acid extract, digesting the residue with sufficient aqueous alkali metal hydroxide to produce an alkaline product until the water dispersibility thereof has been substantially improved, adding at least a portion of said tannic acid extract to the resultant product, and evaporating the product to dryness.

6. A method which comprises extracting tree bark which contains at least 5 percent by weight of tannic acid with water to produce a tannic acid extract, digesting the residue with sufficient aqueous alkali metal hydroxide to produce an alkaline product until the water dispersibility thereof has been substantially improved, adding at least a portion of said tannic acid extract to the resultant product, and evaporating the product to dryness.

References Cited in the file of this patent

UNITED STATES PATENTS

| 2,453,213 | Farber | Nov. 9, 1948 |
| 2,721,840 | Lee | Oct. 25, 1955 |

FOREIGN PATENTS

| 4,358 | Great Britain | 1908 |
| 565,774 | Great Britain | Nov. 28, 1944 |

U. S. DEPARTMENT OF COMMERCE
PATENT OFFICE

CERTIFICATE OF CORRECTION

Patent No. 2,783,122            February 26, 1957

Howard H. Hoekje

It is hereby certified that error appears in the printed specification of the above numbered patent requiring correction and that the said Letters Patent should read as corrected below.

Column 1, line 24, for "varous" read --various--; column 2, line 41, for "dried" read --drier--; line 55, for "dispensed" read --dispersed--.

Signed and sealed this 1st day of April 1958.

(SEAL)
Attest:
KARL H. AXLINE
Attesting Officer

ROBERT C. WATSON
Commissioner of Patents